(12) United States Patent
Di Fabbrizio et al.

(10) Patent No.: US 8,204,751 B1
(45) Date of Patent: Jun. 19, 2012

(54) RELEVANCE RECOGNITION FOR A HUMAN MACHINE DIALOG SYSTEM CONTEXTUAL QUESTION ANSWERING BASED ON A NORMALIZATION OF THE LENGTH OF THE USER INPUT

(75) Inventors: Giuseppe Di Fabbrizio, Florham Park, NJ (US); Junlan Feng, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1004 days.

(21) Appl. No.: 11/459,523

(22) Filed: Jul. 24, 2006

Related U.S. Application Data (60) Provisional application No. 60/779,226, filed on Mar. 3, 2006.

(51) Int. Cl.
*G10L 15/22* (2006.01)
*G10L 15/14* (2006.01)

(52) U.S. Cl. .......................... 704/275; 704/277; 704/256

(58) Field of Classification Search .................. 704/275, 704/277, 256
See application file for complete search history.

(56) References Cited

U.S. PATENT DOCUMENTS

| | | | |
|---|---|---|---|
| 6,324,513 B1 * | 11/2001 | Nagai et al. | 704/275 |
| 2005/0033582 A1 * | 2/2005 | Gadd et al. | 704/277 |
| 2006/0122834 A1 * | 6/2006 | Bennett | 704/256 |
| 2006/0149555 A1 * | 7/2006 | Fabbrizio et al. | 704/275 |

* cited by examiner

*Primary Examiner* — Talivaldis Ivars Smits
*Assistant Examiner* — Farzad Kazeminezhad (57) ABSTRACT

Disclosed are systems, methods and computer-readable media for controlling a computing device to provide contextual responses to user inputs. The method comprises receiving a user input, generating a set of features characterizing an association between the user input and a conversation context based on at least a semantic and syntactic analysis of user inputs and system responses, determining with a data-driven machine learning approach whether the user input begins a new topic or is associated with a previous conversation context and if the received question is associated with the existing topic, then generating a response to the user input using information associated with the user input and any previous user input associated with the existing topic.

19 Claims, 5 Drawing Sheets

RELEVANCE RECOGNITION FOR A HUMAN MACHINE DIALOG SYSTEM CONTEXTUAL QUESTION ANSWERING BASED ON A NORMALIZATION OF THE LENGTH OF THE USER INPUT

PRIORITY CLAIM

The present application claims priority to U.S. Provisional Application No. 60/779,226 filed on Mar. 3, 2006, the contents of which are incorporated herein by reference.

BACKGROUND OF THE INVENTION

1. Field of the Invention

The present invention relates to human-machine dialogs and more specifically to a contextual question answering system in which a user's information needs are satisfied through an interactive question and answer dialog.

2. Introduction

Question Answering (QA) is an interactive human-machine process that aims to respond to users' natural language questions with exact answers rather than a list of documents. In the last few years, QA has attracted broader research attention from both the information retrieval (Voorhees, 2004) and the computational linguistic fields. See for example, conferences held at Macquarie University in Australia are at the University's Center for Language Technology. Publicly accessible web-based QA systems, such as AskJeeves and Start, have scaled up this technology to open-domain solutions. More task-oriented QA systems are deployed as virtual customer care agents addressing questions about specific domains. For instance, the AT&T Ask Allie® is able to answer questions about the AT&T plans and services; and the Ikea "Just Ask Anna!" agent targets questions pertaining the company's catalog.

Most of these QA systems, however, are limited to answer questions in isolation. There are challenges and deficiencies in this approach in that there may be other information available for providing an appropriate answer or response that is not being utilized. To address the deficiencies currently requires much human intervention which costs money and time when a company is seeking to implement an automated question and answer system.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed is a contextual question answering (QA) system in which users' information needs are satisfied through an interactive QA dialogue. One challenge of engaging dialogue into QA systems is to determine whether a question is relevant to the previous interaction context. This task is referred to as relevancy recognition. The inventors propose a data-driven approach for the task of relevancy recognition and evaluate it on two data sets: the TREC data, and the HandQA data.

Embodiments of the invention comprise systems, methods and computer-readable media for controlling a computing device. Disclosed are systems, methods and computer-readable media for controlling a computing device to provide contextual responses to user inputs. The method comprises receiving a user input, generating a set of features characterizing an association between the user input and a conversation context based on at least a semantic and syntactic analysis of user inputs and system responses, determining with a data-driven machine learning approach whether the user input begins a new topic or is associated with a previous conversation context and if the received question is associated with the previous conversation context, then generating a response to the user input using information associated with the user input and relevant previous user input and system responses.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As introduced above, while most systems presently seek to answer questions in isolation, the reality is that users often ask questions naturally as part of contextualized interaction. For instance, a question "How do I subscribe to the AT&T CallVantage® service?" is likely to be followed by other related questions like "How much will the basic plan cost?" and so on. Furthermore, many questions that users frequently want answers for can not be satisfied with a simple answer. Some questions are too complicated, broad, narrow, or vague resulting that there isn't a simple good answer or there are many good answer candidates, which entails a clarification procedure to constrain or relax the search. In all these cases, a question answering system that is able to answer contextual questions is more favored.

Figure 1:
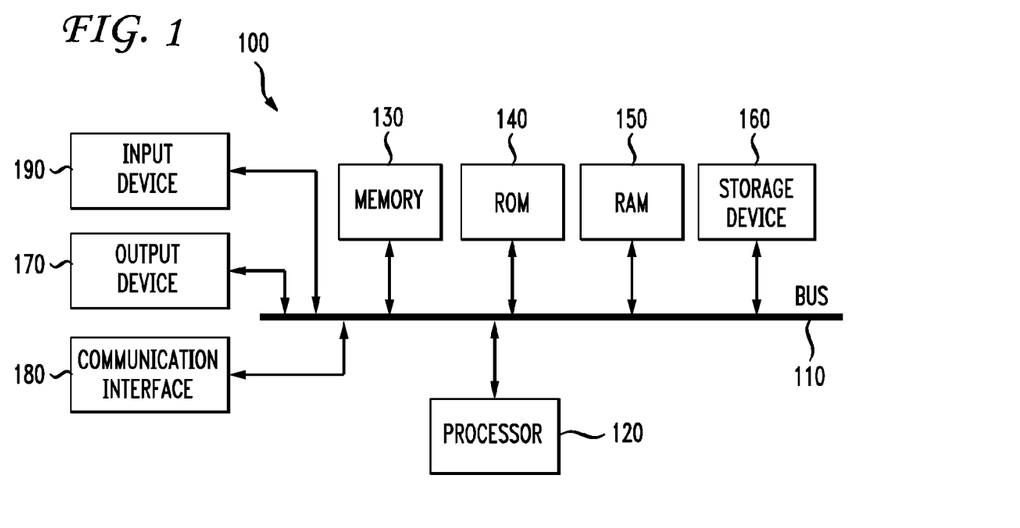
FIG. 1 illustrates a system embodiment of the invention.

The basic system embodiment of the invention is shown in FIG. 1. This figure illustrates example hardware upon which software modules performing the various steps disclosed herein will operate. In many cases, the disclosure refers to the "system" performing steps and FIG. 1 illustrates an example of such a system.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment. Tangible computer-readable data storage media expressly excludes a cable or wireless signal per se and only encompass hardware components that store data.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

Contextual question answering as a research challenge has been fostered by the Text Retrieval Conference (TREC) since 2001. The TREC 2001 QA track made a first attempt to evaluate QA systems' ability of tracking context through a series of questions. The TREC 2004 reintroduced this task and organized all questions into 64 series, with each series focusing on a specific topic. The earlier questions in a series provide context for the on-going question. However, in reality, QA systems will not be informed about the boundaries between series in advance.

One challenge of engaging dialogue into QA systems is to determine the boundaries between topics. For each question, the system needs to determine whether the question begins a new topic or it is a follow-up question related to the current existing topic. We refer to this procedure as relevancy recognition. If a question is recognized as a follow-up question, the next step is to make use of context information to interpret it and retrieve the answer. This procedure comprises a context information fusion. Relevancy recognition is similar to text segmentation, but relevancy recognition focuses on the current question with the previous text while text segmentation has the full text available and is allowed to look ahead.

A rule-based algorithm for relevancy recognition is known. See, e.g., Marco De Boni and Suresh Manandhar, "Implementing clarification dialogues in open domain question answering," *Natural Language Engineering*, 2005, incorporated herein by reference. These rules are manually deduced by carefully analyzing the TREC 2001 QA data. For example, if a question has no verbs, it is a following-up question. This rule—based algorithm achieves 81% in accuracy when recognizing the question relevance in the TREC 2001 QA data set. The disadvantage of this approach is that it involves a good deal of human effort to research and study a specific data set and summarize the rules. For a new corpus from a different domain, it is very likely that one would have to go over the data set and modify the rules, which is time and human-effort consuming. The present inventors propose an alternative, data driven approach to automatically learn the rules from a data set. The proposed approach uses supervised learning classification techniques for the task of relevancy recognition. Experiments show that machine learning approach achieves better recognition accuracy and can also be easily applied to a new domain. In the machine learning approach, training can continue through the dialog such that the system can associate a current question with a previous context in the conversation and extract various features that may be independent of the data.

De Boni and Manandhar observed the following cues to recognize following-up questions. (1) Pronouns and possessive adjectives. For example, if a question has a pronoun that does not refer to an entity in the same sentence, this question could be a following-up question; (2) Cue words. Words such as "precisely" and "exactly"; (3) Ellipsis. For example, if a question is not syntactically complete, this question could be a following-up question; (4) Semantic Similarity. For example, if a question bears certain semantic similarity to previous questions, this question might be a follow-up question.

The De Boni and Manandhar algorithm of calculating the semantic similarity between the current question Q and a previous question Q' is shown below. Supposed Q consists of a list of words $(w_1, w_2, \ldots, w_n)$ and Q' consists of $(w'_1, w'_2, \ldots w'_m)$:

$$SentenceSimilarity(Q, Q') = \sum_{1 \le j \le n} \left( \max_{1 \le i \le m} WordSimilarity(w_j, w'_i) \right) \quad (1)$$

The value of WordSimilarity (w, w') is the similarity between two words, calculated using, for example, the WordNet electronic lexical database proposed by Christiane Fellbaum in 1998. It returns a value between 0 (w and w' have no semantic relations) and 1 (w and w' are the same).

Motivated by these observations, De Boni and Manandhar proposed their rule-based algorithm for relevancy recognition:

Given the current question $Q_i$ and a sequence of history questions $Q_i\text{-}n, \ldots, Q_i\text{-}1$:

1. IF $Q_i$ has a pronoun or possessive adjective which has no referents in the current question, $Q_i$ is a following-up question.

2. If $Q_i$ has cue words such as "precisely" or "exactly", $Q_i$ is a following-up question.

3. If $Q_i$ does not contain any verbs, $Q_i$ is a following-up question.

4. Otherwise, calculate the semantic similarity measure of $Q_i$ as $$SimilarityMeasure(Q_i) = \max_{1 \leq j \leq n} f(j) \cdot SentenceSimilarity(Q_i, Q_{i-j})$$

Here f(j) is a decay function. If the similarity measure is higher than a certain threshold, $Q_i$ is a following-up question.

5. Otherwise, if answer is available, calculate the semantic distance between $Q_i$ and the immediately previous answer $A_i$-1: SentenceSimilarity ($Q_i$, $A_i$-1). If it is higher than a certain threshold, Qi is a following-up question that is related to the previous answer.

6. Otherwise, $Q_i$ begins a new topic.

In the rule-based approach, a question follows the current existing topic if it (1) contains reference to other questions; or (2) contains context-related cue words; or (3) contains no verbs; or (4) bears certain semantic similarity to previous questions or answer. Evaluated on the TREC 2001 QA context track data, the recall of the algorithm is 90% for recognizing first questions and 78% for follow-up questions; the precision is 56% and 76% respectively. The overall accuracy is 81%.

An aspect of the present invention is using machine learning techniques in relevancy recognition. This application of machine learning techniques is a move away from heuristic rules. The inventors formulate the issue as a binary classification problem: a question either begins a new topic or follows the current existing topic. This classification task can be approached with a number of learning algorithms such as support vector machines, Adaboost and artifical neural networks, for example. The inventors discuss generally some experiments using a decision tree although any number of learning algorithms may be applied. For example, other approaches such as Adaboost, support vector machines (SVM) or MaxEnt models (based on the Maximum Entropy principle), etc. may be used. A decision tree is a tree in which each internal node represents a choice between a number of alternatives, and each leaf node represents a decision. Learning a decision tree is fairly straightforward. It begins from the root node which consists of all the training data, growing the tree top-down by recursively splitting each node based on maximum information gain until certain criteria is met. Although the idea is simple, decision tree learning is often able to yield good results. Typically the tree is first trained on a small amount of data and the model is adapted as more data is available.

The present disclosure utilizes, for example, two categories of features: syntactic features and semantic features. Syntactic features capture whether a question has certain syntactic components, such as verbs or pronouns. Semantic features characterize the semantic similarity between the current question and previous questions. The analysis is done on user input (which may be a natural language request) and then continues with further user input as more information about the context is gathered. The input may be a question, comment, or any other type of input and does not necessarily have to be limited to speech. For example, any mode of input may provide data about the context whether the input is graffiti, motion, text input, video input, temperature input, and so forth. In the preferred embodiment, a speech dialog is the interactive environment for the question and answering functions. Therefore, while the examples are given in the speech context, they basic principles may apply elsewhere.

As the first step, each question or user input is tagged with part-of-speech tags using a software tool set for text engineering. An example tool is GATE: a framework and graphical development environment for robust nlp tools and applications published by Cunningham, Maynard, Bontcheva and Tabinan in Proceedings of the 40$^{th}$ ACL, 2002, incorporated herein by reference. An exemplary method then extracts the following binary syntactic features:

PRONOUN: The system determines whether the question or user input has a pronoun or not. There are several ways to do this and to analyze which entity the pronoun refers to. A preferable approach is to label whether a pronoun refers to an entity in the previous questions or in the current question. Currently available tools for anaphora resolution such as GATE, LingPipe and JavaRAP tend to use the nearest noun phrase as the referent for pronouns. Therefore, either currently available tools or proprietary tools are used to identify pronouns.

ProperNoun: The system will determine whether the question or user input has a proper noun or not. NOUN: The system will determine whether the question or user input has a noun or not. VERB: The system will determine whether the question has a verb or not. DefiniteNoun: if a question has a definite noun phrase that refers to an entity in previous question(s), the question is very likely to be a follow-up question. This feature may or may not be applied in practice in that is can introduce misleading information.

Next, the system computes the semantic similarity between two questions. The inventors modified De Boni and Manandhar's formula with a further normalization by the length of the questions as shown in formula (2).

$$SentenceSimilarity(Q, Q') = \frac{1}{n} \sum_{1 \leq j \leq n} \left( \max_{1 \leq i \leq m} WordSimilarity(w_j, w'_i) \right) \quad (2)$$

This normalization has pros and cons. It removes the bias towards long sentences by eliminating the accumulating effect; but on the other hand, it might cause the system to miss a related question, for example, when two related sentences have only one key word in common. An optional idea is to feed the decision tree training both the normalized and non-normalized semantic similarity information and determine the outcome. In some cases, the normalized features have higher information gain in that they appear near the top levels of the learned tree.

Formula (2) shows that sentence level similarity depends on word-word similarity. A variety of ways are known for measuring the semantic similarity or relatedness between two words (to be exact, word senses) based on WordNet. For example, the path (path) measure is the inverse of the shortest path length between two word senses in WordNet; the Wu and Palmer's (wup) measure (See, Wu and Palmer, "Verb semantics and lexical selection," *Proceedings of 32 ACL,* 1994) is to find the most specific concept that two word senses share as ancestor (least common subsumer), and then scale the path length of this concept to the root note (supposed that there is a virtual root note in WordNet) by the sum of the path lengths of the individual word sense to the root node; the Lin's (lin) measure (Lin, "An information-theoretic definition of similarity," *Proceedings of the International Conference on Machine Learning*, 1998) is based on information content, which is a corpus based measure of the specificity of a word; the Vector (vector) measure associates each word with a gloss vector and calculates the similarity of two words as the cosine between their gloss vectors. Any combination of these measure may be applied to contribute the best information to the task of relevancy recognition. Using the WordNet::Similarity tool from Pedersen et al. (2004), the computation of the four measures of path, wup, lin, and vector may be employed in decision tree training. WordNet::Similarity implements nine different measures of word similarity. The inventors preferably use the four described above because they return a value between 0 and 1, which is suitable for using formula (2) to calculate sentence similarity. Notice that the WordNet::Similarity implementation can only measure path, wup, and lin between two nouns or between two verbs, while it uses all the content words for the vector measure. The following semantic features are thus available: path_noun: sentence similarity is based on the nouns similarity using path measure. This is to filter out all other words but nouns from a sentence for measuring semantic similarity. path_verb: sentence similarity is based on the nontrivial verbs similarity using the path measure. Trivial verbs include "does, been, has, have, had, was, were, am, will, do, did, would, might, could, is, are, can, should, shall, being". wup-noun: sentence similarity is based on the nouns similarity using the Wu and Palmer's measure. wup_verb: sentence similarity is based on the non-trivial verbs similarity using the Wu and Palmer's measure. lin_ noun sentence similarity is based on the nouns similarity using the Lin's measure. lin_verb: sentence similarity is based on the nontrivial verbs similarity using the Lin's measure. vector: sentence similarity is based on all content words (nouns, verbs, and adjectives) similarity using the vector measure.

Figure 2:
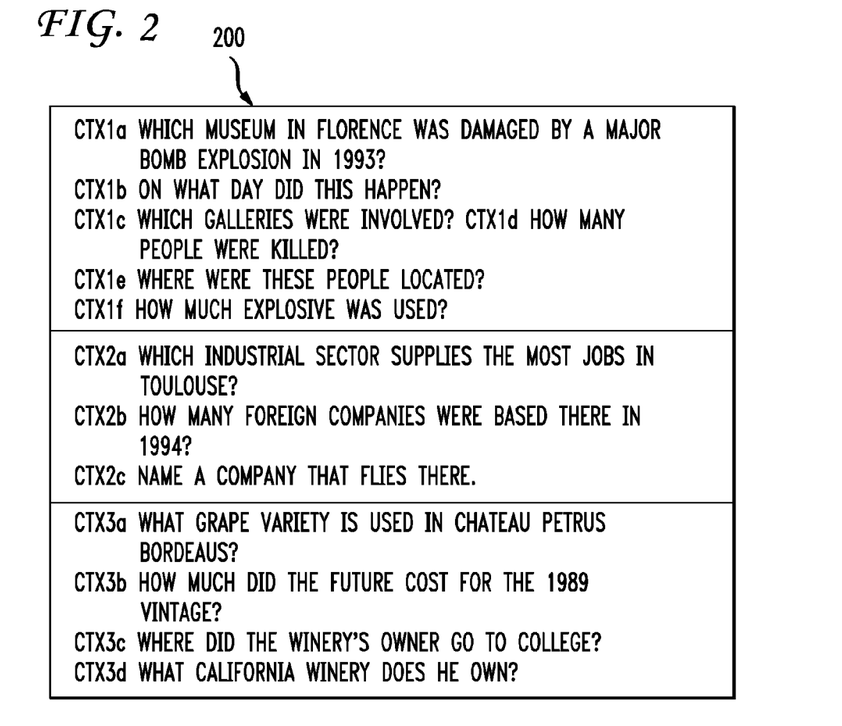
FIG. 2 illustrates example TREC questions.

The inventors ran the experiments on two sets of data: the TREC QA data and the HandQA data. Some of the results are presented next. TREC has contextual questions in 2001 context track in 2004. Questions about a specific topic are organized into a session. In reality, the boundaries between sessions are not given. The QA system would have to recognize the start of a new session as the first step of question answering. The inventors used the TREC 2004 data as training and the TREC 2001 context track data as testing. The training data contain 286 factoid and list questions in 65 sessions; the testing data contain 42 questions in 10 sessions. In the TREC 2004 data, each session of questions is assigned a phrase as the topic, and thus the first question in a session might have pronouns referring to the topic phrase. In this case, the inventors manually replace the pronouns by the topic phrase. On average, each session has about 45 questions. FIG. 2 shows some example questions 200 related to the first three sessions from the TREC 2001 context track data.

The training data that is used to learn relevancy recognition and contextual information fusion for interactive question answering may be drawn from any number of sources, such as at least one of interactive conversations, a series of questions on a same topic or a sequence of question/answer pairs on related topics. These question answer pairs may be FAQ-Answer pairs on a webpage concerning a particular topic or product. The corpus may also be labeled or mined from resources such as documents or the world-wide-web.

Table 1 shows the confusion matrix of the decision tree learning results. On the testing data, the learned model performs with 90% in recall and 82% in precision for recognizing first questions; for recognizing follow-up questions, the recall is 94% and precision is 97%. In contrast, De Boni and Manandhar's rule-based algorithm has 90% in recall and 56% in precision for recognizing first questions; for follow-up questions, the recall is 78% and precision is 96%. The recall and precision of our learned model to recognize first questions and follow-up questions are all better than or at least the same as the rule-based algorithm. The accuracy of the learned model disclosed herein is 93%, about 12% absolute improvement from the rule-based algorithm, which is 81% in accuracy. Although the size of the data is too small to draw a more general conclusion, the data driven approach has better performance.

TABLE 1

Confusion Matrix for TREC Data

| | Training Data Predicted Class | | |
|---|---|---|---|
| True Class | First | Following-up | Total |
| First | 63 | 2 | 65 |
| Following-up | 1 | 220 | 221 |
| Total | 64 | 222 | 286 |

| | Testing Data Predicted Class | | | |
|---|---|---|---|---|
| True Class | First | Following-up | Total | Recall |
| First | 9 | 1 | 10 | 90% |
| Following-up | 2 | 30 | 32 | 94% |
| Total | 11 | 31 | 42 | |
| Precision | 82% | 97% | | |

Figure 3:
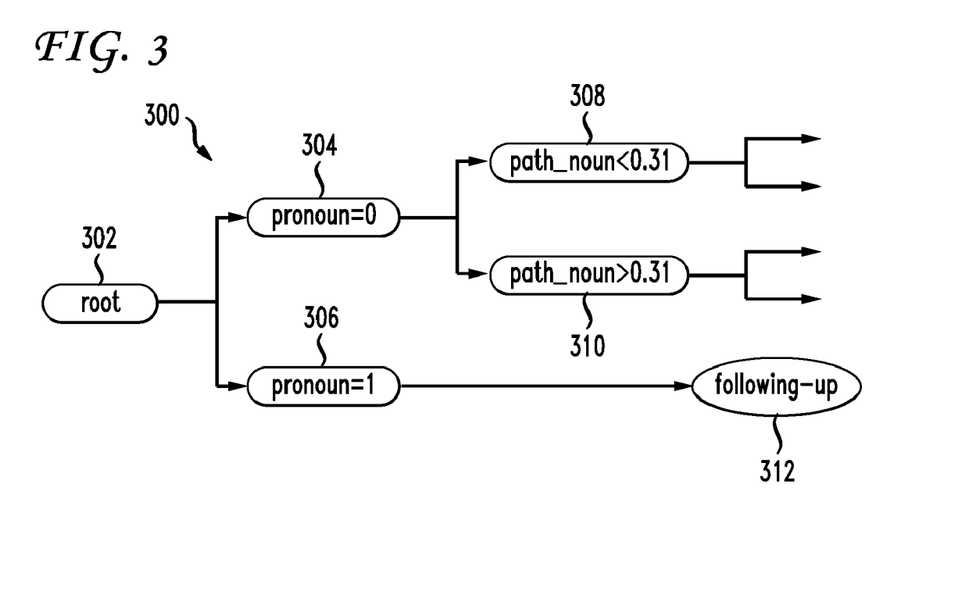
FIG. 3 illustrates a trained tree on TREC data.

FIG. 3 shows the first top two levels of the tree learned from the training data 300. PRONOUN 304, 406 turns out to be the most important feature which has the highest information gain below the root node 302. In the TREC data, when there is a pronoun in a question, the question is very likely to be a follow-up question. In fact, in the TREC 2004 data, the referent of pronouns very often is the topic phrase. The feature path_noun 308, 310, on the second level of the trained tree, turns out to contribute most information in this recognition task among the four different semantic similarity measures. The similarity measures using wup, wup_noun and wup_ verb, and the vector measure do not appear in any node of the trained tree. The follow-up feature is shown as well 312 in the trained tree 300.

The following are rules generated from the training data whose confidence is higher than 90%. Confidence is defined as out of the training records for which the left hand side of the rule is true, the percentage of records for which the right hand side is also true. This measures the accuracy of the rule.

If PRONOUND=1 then follow-up question
If path_noun≧0.31 then follow-up question
If lin_nound≧0.43 then follow-up question
If path-noun<0.15 and PRONOUND=0 then first question De Boni and Manandhar's algorithm has this rule: "if a question has no verb, the question is follow-up question". However, the inventors did not learn this rule from the data, nor the feature VERB appears in any node of the trained tree. One possible reason is that this rule has too little support in the training set (support is defined as the percentage of which the left hand side of the rule is true). Another possible reason is that this rule is not needed because the combination of other features is able to provide enough information for recognizing following-up questions. In any case, the decision tree learns a (local) optimized combination of features which captures most cases, and avoids redundant rules.

Other machine learning approaches in addition to a decision tree may be used as well. The inventors applied the Adaboost machine learning approach (See, Schapire and Singer, "BoosTexter: A boosting-based system for text categorization," *Machine Leaning*, 2000), which is resistant (but not always) to over-fitting. It calls a given weak learning algorithm repeatedly in a series of rounds t=1, . . . , T. Each time the weak learning algorithm generates a rough "rule of thumb", and after many rounds Adaboost combines these weak rules into a single prediction rule that should be more accurate than any one of the weak rules. Table 2 shows the confusion matrix of Adaboost learning results. It shows that Adaboost is able to correctly recognize "What does transgenic mean?" as beginning a new topic. However, Adaboost has more errors in recognizing follow-up questions, which results in an overall accuracy of 88%, slightly lower than decision tree learning. Therefore, the decision tree learning is the preferred approach.

TABLE 2

Confusion Matrix Using Adaboosting

| | Training Data Predicted Class | | |
|---|---|---|---|
| True Class | First | follow-up | Total |
| First | 64 | 1 | 65 |
| follow-up | 1 | 220 | 221 |
| Total | 65 | 221 | 286 |

| | Testing Data Predicted Class | | | |
|---|---|---|---|---|
| True Class | First | follow-up | Total | Recall |
| First | 10 | 0 | 10 | 100% |
| follow-up | 5 | 27 | 32 | 84% |
| Total | 15 | 27 | 42 | |
| Precision | 67% | 100% | | |

Next the results on experiments with the HandQA data are discussed. The inventors conducted an experiment using real-world customer care related questions. Test data was selected from the chat logs of a deployed online QA system, referred to as HandQA. HandQA is built using a telecommunication ontology database and 1600 pre-determined FAQ-answer pairs. For every submitted customer question, HandQA chooses one of these 1600 answers as the response. Each chat session contains about 3 questions. It is assumed that the questions in a session are context-related.

Figure 4:
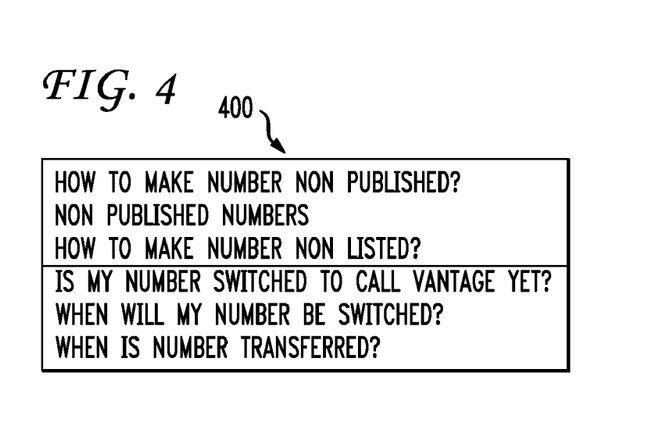
FIG. 4 illustrates example questions in HandQA.

The HandQA data are different from the TREC data in two ways. First, HandQA questions are real typed questions from motivated users. The HandQA data contain some noisy information, such as typos and bad grammars. Some users even treated this system as a search engine and simply typed in the keywords. Second, questions in a chat session basically asked for the same information. Very often, when the system failed to get the correct answer to the user's question, the user would repeat or rephrase the same question, until they gave up or the system luckily found the answer. As an example, FIG. 4 shows two chat sessions 400. The inventors did not make of the system's answer in our relevancy recognition.

A subset of the HandQA data (5908 questions in 2184 sessions) is used for training and testing the decision tree. The data were randomly divided into two sets: 90% for training and 10% for testing.

Table 3 shows the confusion matrix of the decision tree learning results. For recognizing first questions, the learned model has 73% in recall and 62% in precision; for recognizing following-up questions, the recall is 75% and precision is 84%. The accuracy is 74%. A base line model is to have all questions except the first one as following up questions, which results in the accuracy of 64% (380/590). Thus the learned decision tree yields an absolute improvement of 10%. However, the results on this data set are not as good as those on the TREC data.

TABLE 3

Confusion Matrix for HandQA Data

| | Training Data Predicted Class | | |
|---|---|---|---|
| True Class | First | Following-up | Total |
| First | 1483 | 490 | 1973 |
| Following-up | 699 | 2646 | 3345 |
| Total | 2182 | 3136 | 5318 |

| | Testing Data Predicted Class | | | |
|---|---|---|---|---|
| True Class | First | Following-up | Total | Recall |
| First | 153 | 58 | 211 | 73% |
| Following-up | 93 | 286 | 379 | 75% |
| Total | 246 | 344 | 590 | |
| Precision | 62% | 84% | | |

Figure 5:
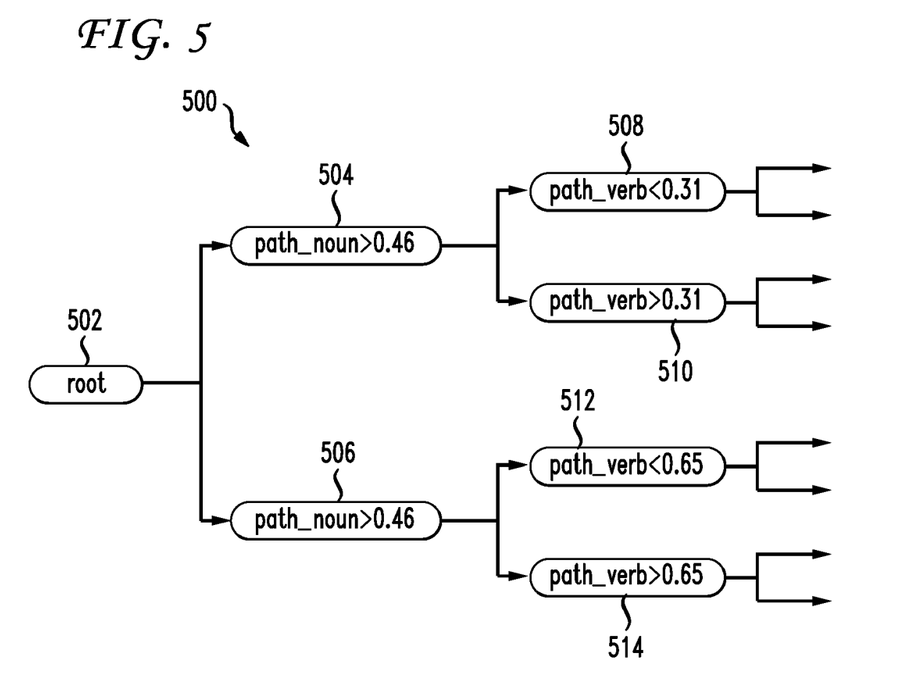
FIG. 5 illustrates a trained tree on HandQA data.

FIG. 5 shows the top two levels of the tree learned 500 from the training data, both of which are on the semantic measure path. This again confirms that path best fits the task of relevancy recognition among the four semantic measures. Above the root node 502 are two path_noun nodes 504 and 506. Next are four path_verb nodes 508, 510, 512 and 514 within the tree.

No syntactical features appear in any node of the learned tree. This is not surprising because syntactic information is noisy in this data set. Typos, bad grammars, and miscapitalization affect automatic POS tagging. Keywords input also results in incomplete sentences, which makes it unreliable to recognize following-up questions based on whether a question is a complete sentence or not. Furthermore, because questions in a session rarely refer to each other, but just repeat or rephrase each other, the feature PRONOUN does not help either. All these make syntactic features not useful. Semantic features turn out to be more important in this data set.

There are two reasons for the decreased performance in this data set. The first reason, as analyzed above, is that syntactical features do not contribute to the recognition task. The second reason is that consecutive chat sessions might ask for the same information. In the handQA data set, questions are basically all about telecommunication service, and questions in two consecutive chat sessions, although by different users, could be on very similar topics or even have same words. Thus, questions, although in two separate chat sessions, could have high semantic similarity measure. This would introduce confusing information to the decision tree learning.

Having discussed some of the aspects of the invention above, the disclosure next discusses relevancy recognition and making use of the context information. Relevancy recognition is the first step of contextual question answering. If a question is recognized as following the current existing topic, the next step is to make use of the context information to interpret it and retrieve the answers. To explore how context information helps answer retrieval, the inventors conducted preliminary experiments with TREC 2004 QA data. The inventors indexed the TREC documents using the Lucene search engine (Hatcher and Gospodnetic, 2004) for document retrieval. The Lucene search engine takes as input a query (a list of keywords), and returns a ranked list of relevant documents, of which the first 50 were taken and analyzed in our experiments. Any other search engine may be applied as well. The inventors attempted different strategies for query formulation. Simply using the questions as the query, only 20% of the follow-up questions find their answers in the first 50 returned documents. This percentage went up to 85% when the topic words, provided in TREC DATA for each section, were used as the query. Because topic words are usually not available in real world applications, and to be more practical, the inventors tried using the noun phrases in the first question as the query. In this case, 81% of the questions are able to find the answers in the returned documents. When the inventors combined the (follow-up) question with the noun phrases in the first question as the query, the retrieved rate increases to 84%. Typically, document retrieval is a crucial step for QA systems. These results suggest that context information fusion improves the performance of answer retrieval.

Present herein are data driven approaches such as decision tree learning for the task of relevancy recognition in contextual question answering. Experiments show that this approach achieves improved accuracy on the TREC data and about 12% improvement from the rule-based algorithm. Moreover, this data-driven approach requires much less human effort on investigating a specific data set and less human expertise to summarize rules from the observation. All the features used in the training can be automatically extracted. This makes it straightforward to train a model in a new domain, such as the HandQA. Furthermore, decision tree learning is a white-box model and the trained tree is human interpretable. It shows that the path measure has the best information gain among the other semantic similarity measures.

Figure 6:
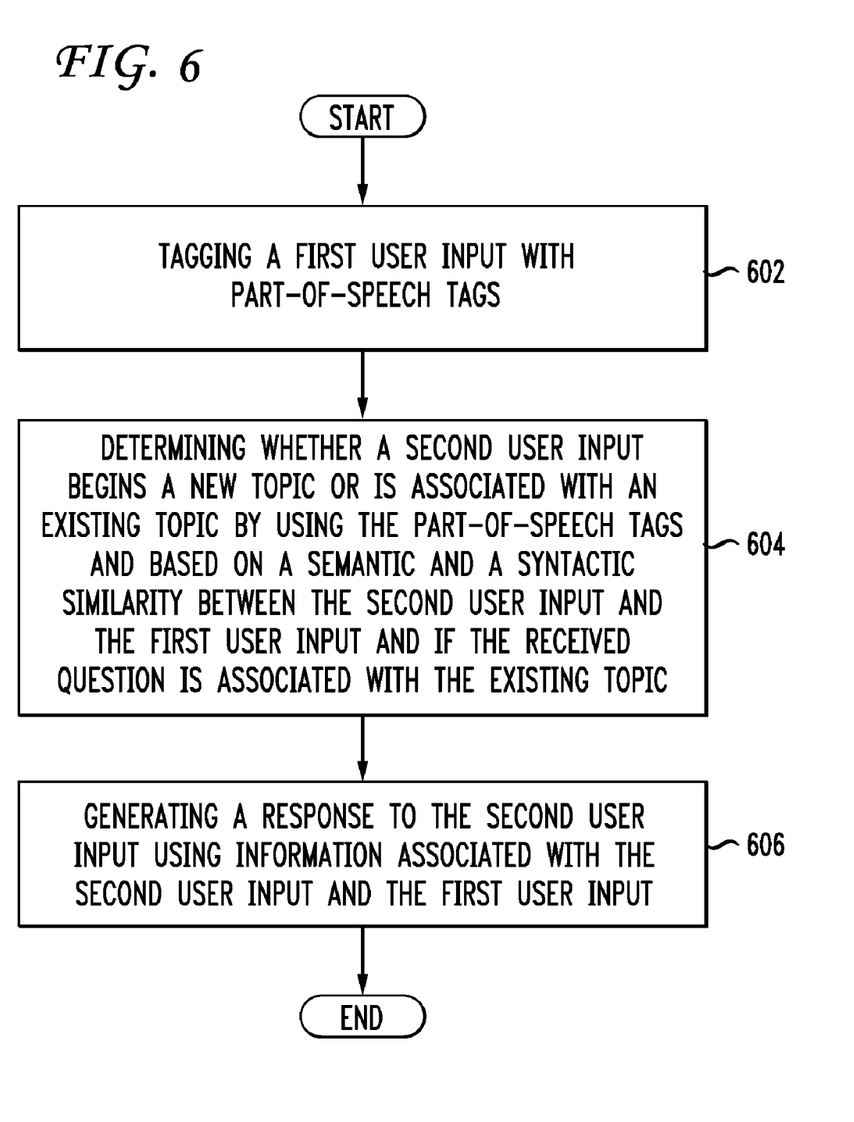
FIG. 6 illustrates a method embodiment of the invention.

An exemplary method embodiment of the invention is illustrated in FIG. 6. In this figure, a method of providing contextual responses in a dialog is shown which comprises the steps of tagging a first user input with part-of-speech tags (602), determining whether a second user input begins a new topic or is associated with an existing topic by using the part-of-speech tags and based on a semantic and a syntactic similarity between the second user input and the first user input (604) and, if the received question is associated with the existing topic, then generating a response to the second user input using information associated with the second user input and the first user input (606). The first user input and the second user input is classified based on context space which enables the system to analyze the user input in a particular context to aid in generating a response.

Typically the user inputs are questions but they may be any other type of input such as comments and so forth. The input may be any other type of multimodal input as well that is processed in a similar manner. The response will typically be an answer to the second user input. Determining whether the second user input begins a new topic may be based on the semantic similarity between the second user input and the first user input. This determination step may also be further based on a normalization of a length of the first user input and the second user input. As mentioned above generating the response to the second user input may further comprise using an information fusion of the second user input and the first user input.

Figure 7:
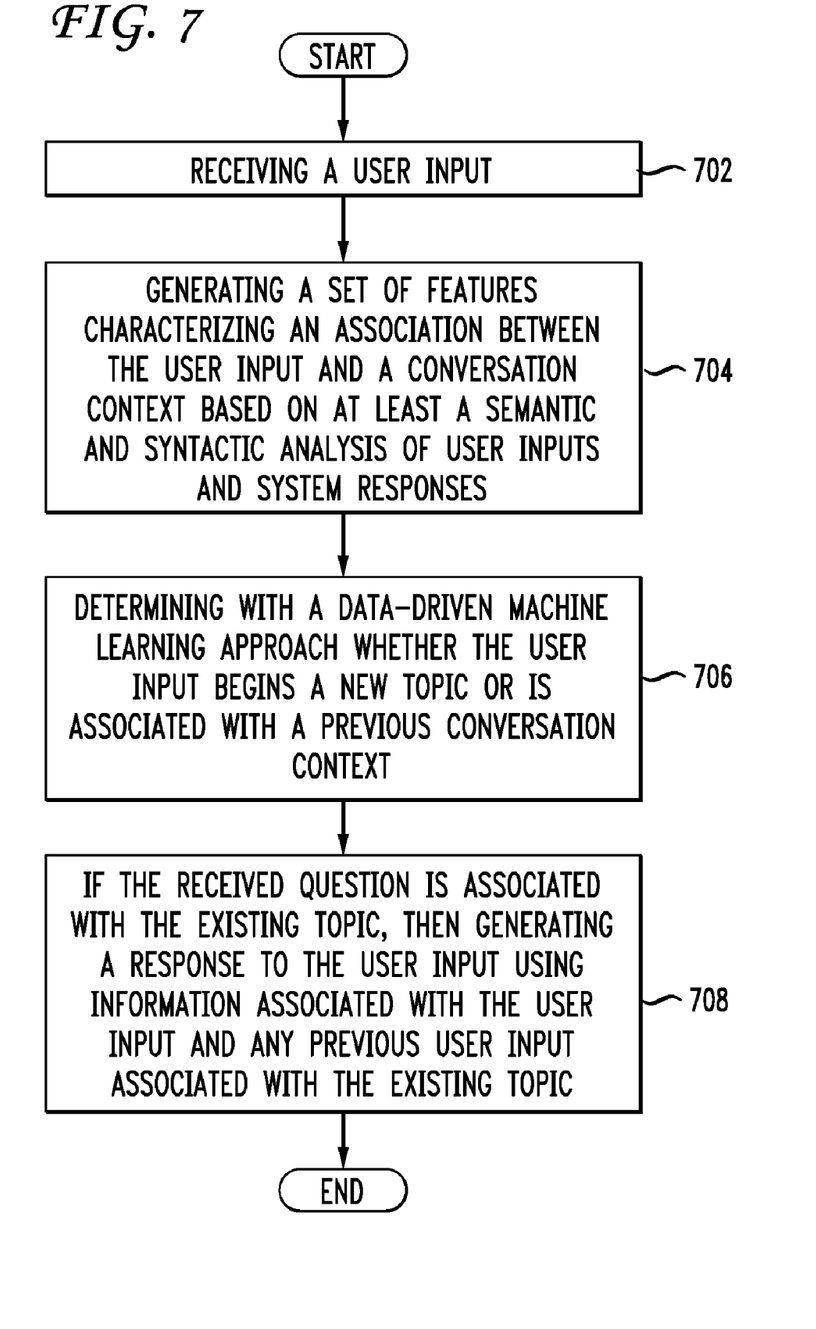
FIG. 7 illustrates another method embodiment.

FIG. 7 illustrates another embodiment for providing contextual responses to user input. This may be termed a method for providing interactive question answering. This method comprises receiving a user input (702), generating a set of features characterizing an association between the user input and a conversation context based on at least a semantic and syntactic analysis of user inputs and system responses (704), determining with a data-driven machine learning approach whether the user input begins a new topic or is associated with a previous conversation context (706) and if the received question is associated with the existing topic, then generating a response to the user input using information associated with the user input and any previous user input associated with the existing topic (708).

An example of a machine learning approach may be one that applies learning techniques from previous interactive dialogs with a user or users to determine in the conversation where to judge when a question refers to context or starts a new context, or when a new topic is started. Knowledge that is useful may come from unstructured documents such as websites or any other type of document. Models may be developed using machine learning techniques for analyzing these types of documents and with previous user input, previous system responses and a current user input, the system may be assisted by context information to present the right answer to the user's question.

A context fusion generally involves fusing information into a context when doing question answering. A context may be, for example, a context of a user seeking to retrieve information about their account. As a dialog or conversation or interaction between the user and the system continues, there may be various pieces of information based on either what the user says or responses the system provides that may modify or change the context. Any of this information may be fused into the context and thus provide an updated context. Another example may be where a user asks a first question "what is the call vantage service?" and then asks a follow up question "how much does it cost?". The use of the pronoun "it" clearly refers to the call vantage service and the second follow up question clearly shares the same context as the first question. Because the system in the present invention has utilized machine learning techniques to identify the various cues in the user input, the system can identify when a question or user input is in the same context or a follow up question. One example of a clue is the use of the pronoun "it" in the follow up question. Another way to spot clues is to perform a semantic analysis between user inputs and determine how much does it cost in comparison. The present system seeks to automatically come up with rules from the data which is available. A set of features will be developed which help to associate user input to context information. A bunch of features may be found and fed into a classifier or machine learning approach. The set of features indicates the association of the current user input/question and the context. For example, how similar is A & B, or you want to know the reference or the solution. These are fed to a classifier and the find result is whether the user input refers to context or a new question. The approach may be supervised or unsupervised but utilizes data for training the machine learning module to classify the input.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, many different algorithms are referenced above and those of skill in the art will recognize alternate approaches or proprietary approaches that may be applied. Furthermore, any experimental data is only provided for context and there should not be any interpretation of any experimental results that are incorporated into the claims as limitations. The experimental data is exemplary only. Accordingly, the appended claims and their legal equivalents should only define the invention, rather than any specific examples given.

We claim:

1. A method of automatically providing interactive question answering in a continuous dialog with a user, the method comprising:
receiving a current user input as part of the continuous dialog;
generating a set of features characterizing an association between the current user input and a conversation context based on at least a semantic and syntactic analysis of prior user inputs received before the current user input and system natural language responses to the prior user inputs within the continuous dialog, wherein a same user provides the current user input and the prior user inputs;
determining, based on a normalization of a length of the user input and a previous user input of the prior user inputs, with a data-driven machine learning approach whether the current user input begins a new topic of the continuous dialog or is associated with an existing topic related to a previous conversation context within the continuous dialog;
and if the current user input is associated with the existing topic, then generating a response to the current user input using information associated with the current user input and content in any previous user input associated with the existing topic.

2. The method of claim 1, wherein generating response to the current user input further comprises using a model trained for context fusion.

3. The method of claim 1, wherein the previous conversation context is associated with a topic.

4. The method of claim 1, wherein the data-driven machine learning approach is applied using one of a decision tree, Adaboost, SVM or MaxEnt.

5. The method of claim 1, wherein a user input is a natural language request.

6. The method of claim 1, wherein the training data used to learn relevancy recognition and contextual information fusion models for interactive question answering comprises at least one of: interactive conversations, a series of questions on a same topic, or a sequence of question/answer pairs on related topics.

7. The method of claim 1, wherein the prior user inputs are classified based on context space.

8. The method of claim 1, wherein generating a response to the current user input using information associated with the current user input and content in any previous user input associated with the existing topic further comprises using an information fusion of the current user input and the previous user input.

9. The method of claim 1, wherein the prior user inputs are classified based on context space.

10. A system for providing interactive question answering in a continuous dialog with a user, the method comprising:
a first module configured to control a processor to receive a current user input as part of the continuous dialog;
a second module configured to control the processor to generate a set of features characterizing an association between the current user input and a conversation context based on at least a semantic and syntactic analysis of prior user inputs received before the current user input and system natural language responses to the prior user inputs within the continuous dialog, wherein a same user provides the current user input and the prior user inputs;
a third module configured to control the processor to determine, based on a normalization of a length of the user input and a previous user inputs, with a data-driven machine learning approach whether the current user input is one of beginning a new topic within the continuous dialog or is associated with an existing topic related to a previous conversation context of the continuous dialog; and
a fourth module configured, if the current user input is associated with the existing topic, to control the processor to generate a response to the current user input using information associated with the current user input and content in any prior user inputs associated with the existing topic.

11. The system of claim 10, wherein the fourth module further uses a model trained for context fusion.

12. The system of claim 10, wherein the previous conversation context is associated with a topic.

13. The system of claim 10, wherein the data-driven machine learning approach is applied using one of a decision tree, Adaboost, SVM or Maxent.

14. The system of claim 10, wherein a user input is a natural language request.

15. The system of claim 10, wherein the prior user inputs are classified based on context space.

16. The system of claim 10, wherein generating a response to the current user input using information associated with the current user input and content in any prior user inputs associated with the existing topic further comprises using an information fusion of the current user input and the prior user inputs.

17. A non-transitory computer-readable storage medium storing instructions for providing interactive question answering in a continuous dialog with a user, the instructions comprising computer-executable instructions for:

receiving a current user input as part of the continuous dialog;

generating a set of features characterizing an association between the current user input and a conversation context based on at least a semantic and syntactic analysis of prior user inputs received before the current user input and system natural language responses to the prior user inputs within the continuous dialog, wherein a same user provides the current user input and the prior user inputs;

determining, based on a normalization of a length of the user input and a previous user input of the prior user inputs, with a data-driven machine learning approach whether the current user input is one of beginning a new topic within the continuous dialog or is associated with an existing topic related to a previous conversation context of the continuous dialog; and if the current user input is associated with the existing topic, then generating a response to the current user input using information associated with the current user input and content in any previous user input of the prior user inputs associated with the existing topic.

18. A non-transitory computer-readable storage medium of claim 17, wherein generating a response to the current user input further comprises using a model trained for context fusion.

19. A non-transitory computer-readable storage medium of claim 18, wherein training data used to learn relevancy recognition and contextual information fusion models for interactive question answering comprises at least one of: interactive conversations, a series of questions on a same topic, or a sequence of question/answer pairs on related topics.

* * * * *